June 27, 1972    I. J. RATHBONE    3,672,736

ANNULAR SHIELD FOR BEARINGS

Filed Jan. 26, 1970

United States Patent Office 3,672,736
Patented June 27, 1972

3,672,736
ANNULAR SHIELD FOR BEARINGS
Ivanhoe J. Rathbone, Ascot, England, assignor to Remo Precision Tools Limited, Wokingham, England
Filed Jan. 26, 1970, Ser. No. 5,835
Claims priority, application Great Britain, Feb. 12, 1969, 7,674/69
Int. Cl. F16c 33/78
U.S. Cl. 308—187.2
5 Claims

ABSTRACT OF THE DISCLOSURE

The invention is concerned with a bearing having at least one end an annular shield between the inner and outer races. The shield is held in position within the outer race by means of resilient radially outer portions which are outwardly displaced from the otherwise circular outer edge of the shield, these portions being received as a snap fit in a groove formed in the outer member.

Figure 1:
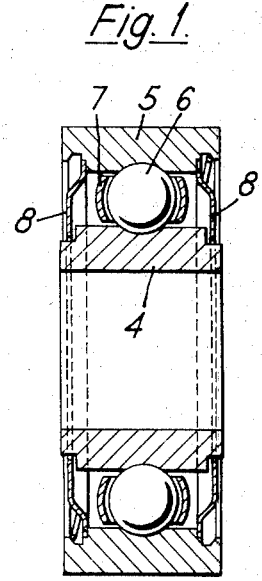

Bearings having inner and outer rings or other races with a number of balls or rollers between them are often provided with shields covering the annular space between the two races at one or both axial ends of the bearing to prevent dust and other foreign matter entering the bearing. Conventionally the shields are annular in form and may either be flat or dished having a flat radially inner section, a frusto-conical intermediate section and a flat radially outer section, the frusto-conical intermediate section tapering towards the corresponding axial end of the bearing. The inner surface of the outer race is formed with a groove of which the surface facing the axial end of the bearing is stepped to form a recess to receive the outer section of the shield, and the opposed face is frusto-conical and provides a wedging surface. A circlip fits between the frusto-conical surface of the groove and the outer section of the shield to hold the shield in place. The conical form of the centre section of the dished form of the shield enables the axial length of the bearing to be kept to a minimum while leaving a clearance between the shield and the balls or rollers sufficient to accommodate an axial displacement of the inner race relative to the outer race when the bearing is loaded axially.

This conventional arrangement has several disadvantages. First, the shield must fit into the recess with at least a small radial clearance with the result that it is not generally precisely centred. There must then be a rather larger radial clearance between the shield and the inner race if the shield is never to touch the inner race, and the larger the clearance between these, the less effectively the shield prevents dust or other foreign matter from penetrating into the bearing. Secondly, for bearings in which the very highest possible precision is necessary, the small radially outward force exerted by the circlip on the outer race deforms the outer race away from its precise, circular cross-section. Thirdly, the assembly of the shield and circlip has to be performed by hand which is expensive. Finally, the circlip cannot extend fully around the race and consequently the shield is not evenly held around its whole periphery.

In accordance with the present invention, a bearing has inner and outer races with a number of balls or rollers between them and an annular shield at one or both axial ends covering an annular clearance between the inner and outer races, the shield having resilient, radially outer portions outwardly displaced from its otherwise circular outer edge and received as a snap fit in a groove formed in the outer race.

The radially outer portions may be defined by arcuate slits formed close to the edge of the shield, the portions between the slits and the edge being displaced radially outwards so that the slits become crescent-shaped.

If the groove has the same form as that already described then the radially outer portions of the shield should be displaced axially as well as radially to bear against the frusto-conical wedging surface of the groove. Alternatively if a narrower groove is used in which the axially inner face is flat rather than stepped the radially outer portions need be displaced only radially. In either case the forces between the shield and the outer race are mainly axial and do not distort the circular cross-section of the race.

The shield should be formed from material which provides sufficient resilience in the radially outer portions, hardenable stainless steel for example.

Preferably there are three radially outer portions which centre the shield positively so that the clearance between the shield and the inner race can be reduced. However, other numbers of radially outer portions are possible.

Figure 2:
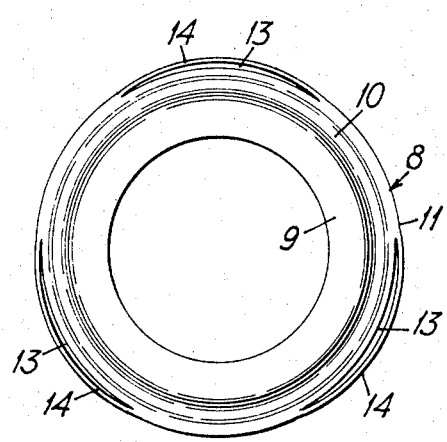
Figure 3:
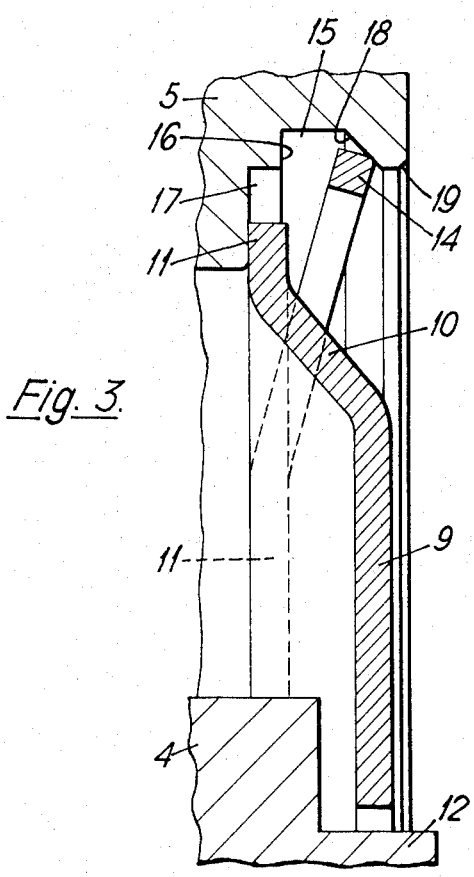

One example of a ball bearing constructed in accordance with the present invention is illustrated in the accompanying drawings, in which:

FIG. 1 is an axial section through the bearing;
FIG. 2 is an axial face view of one annular end shield of the bearing; and
FIG. 3 is an enlargement of part of FIG. 1.

The illustrated bearing has an inner annular race ring 4 which is arranged to receive and to be fixed to a shaft and an outer race ring 5. The usual ring of balls 6 are mounted in shallow annular grooves in the rings 4 and 5 and are maintained angularly spaced by the usual cage 7.

Each axial end of the annular space between the rings 4 and 5 is substantially closed by an annular shield 8 made of hardenable stainless steel.

Each shield 8 comprises a flat radially inner section 9, a frusto-conical intermediate section 10, and a flat radially outr section 11, so that the shield is dish shaped. The shield is mounted in the outer ring 5 and the inner periphery of the shield is slightly larger in diameter than a stepped end portion 12 of the inner ring 4 which it thus surrounds with a very slight clearance.

Each shield 8 is provided in its section 11 with three part circular slits 13 equiangularly spaced around the shield and each extending over an arc of between 20 and 30°. The outer portion of the shield material 14 radially outside each slit 13 is displaced radially outwardly so that each slit is opened into a crescent shape, and is also displaced axially as shown particularly in FIG. 3.

At each axial end of the outer ring 5 is provided with a groove 15 the axial inner face 16 of which is stepped to provide a recess 17. The other axial end face 18 of the groove is frustoconical and there is a small chamfer 19 at the entrance to the ring 5. The displacement of the portions 14 is matched to the dimensions of the groove 15 so that each shield is fitted into the corresponding end of the outer ring 5 by pressing the shield axially so that the portions 14 snap over the chamfer 19 and into the groove 15. In this position the sections 11 rest in the recess 17 and the portions 14 bear against the frustoconical face 18 of the groove 15. The three point support provided by the resilient portions 14 bearing against the face 18 ensure that the shield is accurately centered and there is only a resultant axial reaction between the shield and the face 18.

I claim:
1. In combination, a bearing having inner and outer races with a number of balls or rollers therebetween, and an annular shield at at least one axial end of said bearing covering an annular clearance between said inner and outer races, said shield having first edge portions lying in a circular locus and integral, resilient, radially displaced second edge portions projecting radially outward beyond said circular locus and received as a snap fit in a groove formed in the outer race, said second edge portions being defined by arcuate slits found close to the edge of the shield, the portions between the slits and the edge being displaced radially outward, whereby said slits are crescent shaped.

2. A bearing according to claim 1, in which the inner surface of said outer race is formed with said groove of which the surface facing the axial end of said bearing is stepped to form a recess to receive the outer section of said shield, and the opposed face of said groove is frustoconical and provides a wedging surface for said radially outer portions of the shield which are also displaced axially.

3. A bearing according to claim 1, in which there are three equi-angularly spaced radially outer portions.

4. A bearing according to claim 3, in which each slit extends over an arc of between 20 and 30° around the shield.

5. A bearing according to claim 2, in which said shield is dished having a flat radially inner section, a frustoconical intermediate section, and a flat radially outer section, the frustoconical intermediate section tapering towards the corresponding axial end of the bearing.

References Cited

UNITED STATES PATENTS

| 3,206,262 | 9/1965 | Haag | 308—187.2 |
| 3,449,029 | 6/1969 | Smith | 308—187.2 |

FOREIGN PATENTS

| 728,041 | 2/1966 | Canada | 308—187.2 |

MARTIN P. SCHWADRON, Primary Examiner

B. GROSSMAN, Assistant Examiner

U.S. Cl. X.R.

277—94